United States Patent

[11] 3,562,621

| [72] | Inventor | Johannes M. Schaefer<br>Wilton, Conn. |
|---|---|---|
| [21] | Appl. No. | 656,277 |
| [22] | Filed | July 26, 1967 |
| [45] | Patented | Feb. 9, 1971 |
| [73] | Assignee | Technipower Incorporated<br>South Norwalk, Conn.<br>a corporation of Connecticut |

[54] INRUSH CURRENT LIMITING CIRCUIT FOR RECTIFIER CIRCUITS WITH CAPACITIVE LOAD
10 Claims, 6 Drawing Figs.

[52] U.S. Cl................................................... 320/1,
321/18; 323/22
[51] Int. Cl...................................................... H02n 3/18
[50] Field of Search............................................ 320/1;
321/18, 455; 323/22 (SCR)

[56] References Cited
UNITED STATES PATENTS
3,243,689  3/1966  Perrins.......................... 323/22

| 3,377,542 | 4/1968 | Glorioso........................ | 321/18 |
| 3,389,328 | 6/1968 | Janson........................... | 323/22X |
| 3,432,725 | 3/1969 | Rotch............................ | 320/1X |

Primary Examiner—Terrell W. Fears
Attorney—James and Franklin

ABSTRACT: A rectifier circuit with capacitive load in which means are provided for preventing inrush current on start-up, this being accomplished by controlling the firing time of a controlled rectifier in accordance with sensing the voltage across the capacitive load; timing is achieved by appropriately varying the charging rate of a regulating capacitor which is periodically discharged; parameter regulating means is superimposed and is effective, once the parameter in question reaches a predetermined range, to take over control of the regulating capacitor charging rate and to thereafter modify that charging rate in order to maintain the parameter in question at a predetermined value.

INVENTOR
JOHANNES M. SCHAEFER
BY
ATTORNEYS

INVENTOR
JOHANNES M. SCHAEFER

BY *James and Franklin*
ATTORNEYS

INRUSH CURRENT LIMITING CIRCUIT FOR RECTIFIER CIRCUITS WITH CAPACITIVE LOAD

The present invention relates to a rectifier circuit with capacitive load in which means are provided for limiting current surges during periods of buildup or emergency, and to accomplish this by means of circuitry which is simple and dependable and which is used for conventional regulation purposes when the emergency conditions normally producing inrush current do not obtain.

The power handling capacity of power supplies is limited by the power handling capacity of the components used therein. In the case of transistorized power supplies this becomes a significant factor, since the power handling capacities of transistors generally available on the market at low or moderate prices are relatively limited. Power is, of course, determined primarily by current. Situations arise where abnormal current requirements are placed on a power supply, such as when a short circuit occurs in the load connected thereto. Means must therefore be provided to in some way limit the amount of current flowing therethrough when such a short circuit condition comes into existence. Many such means have been proposed in the past; they are generally characterized by a relatively high degree of complexity and by requiring special circuitry. Moreover, they act relatively slowly compared with the time of a power cycle, and they act retrospectively, after sensing the condition in question.

There is another situation where high current demands are imposed upon a system and which arises with considerable frequency. When a rectifier circuit with capacitive load is first put into operation the capacitor across the load is uncharged. Hence there is a great voltage difference between the output voltage of the rectifier circuit and the voltage of the capacitor. There is hardly any resistance or inductance in the circuit to limit the current. Hence a very large current pulse during the first half-cycle of operation would result. In order to take care of this high inrush starting current it is necessary to use components of higher power-handling capacity than would otherwise be needed, therefore adding appreciably to the cost of the system.

It is the prime object of the present invention to devise a rectifier circuit with capacitive load in which the inrush current at the time of starting the system is automatically controlled. The same circuitry which accomplishes this result also provides an appreciable degree of short circuit protection. The same circuitry which accomplishes these results is also used to provide output voltage regulation, that regulation being effective during normal operation of the system but the inrush current limiting system taking control whenever appropriate circuit conditions obtain.

To these ends, in the power supply embodiment here specifically illustrated, the input and output are connected by controlled rectifiers, the input being AC and the output being DC The rectifiers will be potentially conductive during those times in the AC input cycle when they are appropriately biased, but they will not actually conduct until their control electrodes are appropriately energized. Circuitry is provided for determining the moment in the period of potential conductivity when the control electrodes of the rectifiers are energized. The sooner that moment occurs in a given cycle the longer will be the time of current flow. The timing of the energization of the rectifier control electrodes is accomplished by a regulating capacitor charging circuit, the regulating capacitor being periodically discharged, permitted to charge, discharged, and so on, the energization of the rectifier control electrodes occurring when the charge on the regulating capacitor reaches a predetermined value. A source of charging current for the capacitor is derived from the voltage across the capacitive load; the lower that voltage, the lower will be the charging current. Hence when the system starts up (or when a short circuit exists in the load) the voltage across the capacitive load will be very low, the charging current supplied to the regulating capacitor will be correspondingly low, said capacitor will take a comparatively long time to charge, the rectifiers will be energized to pass current only during the latter part of their potentially conductive periods, and hence only a limited inrush current buildup will be permitted. As the output voltage builds up the charging rate of the regulating capacitor will increase, the rectifiers will be rendered conductive at an earlier point in their cycles, and the time duration of the current pulses will correspondingly lengthen. Thus the inrush of current at the time of starting up (or of short circuit) is limited and controlled and the output voltage builds up gradually.

When the system is operating under normal conditions an output parameter, such as voltage, is sensed and it is caused to control the charge of the capacitor in the opposite sense from that just described—as the output voltage, for example, rises above a predetermined value the charging current available to the capacitor is decreased, thereby causing the capacitor to charge more slowly, causing the rectifier control electrodes to be energized later, and hence reducing the output. Thus regulation is achieved.

It is preferred, and it is here specifically disclosed, that the timing or regulating capacitor be provided with a pair of charging current sources one of which is substantially independent of the voltage across the capacitive load, this latter source thus ensuring voltage buildup when the voltage across the capacitive load is zero (as it would be when the system is first put into operation).

It will be noted that the same regulating capacitor and charging system is employed both for normal output regulation and for inrush current control, the system being arranged in such a way that the inrush current control is predominant during the starting of the system, the normal regulating control is predominant during normal operation of the system, and the inrush current control again becomes predominant when excessive current demand is placed on the system.

It is a significant feature of the system of the present invention that the timing for the initial half-cycle is, in effect, precomputed on the basis of a zero voltage across the capacitive load, the timing for the subsequent half-cycles being determined by the degree to which voltage is actually built-up across the capacitive load. It is in this way, by determining in advance the duration of current flow during the first half-cycle, that the system is made fast enough acting to be effective in limiting inrush current.

To the accomplishment of the above, and to such other objects as may hereinafter appear, the present invention relates to an inrush current limiting circuit for rectifier circuits with capacitive load as defined in the appended claims and as described in this specification, taken together with the accompanying drawings, in which:

Figure 3:
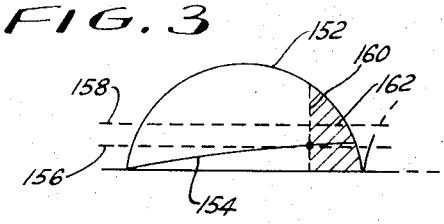
Figure 4:
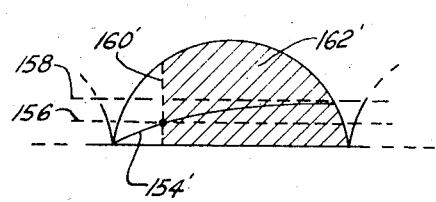
Figure 5:
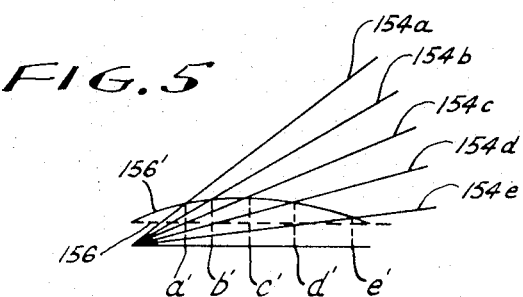
Figure 6:
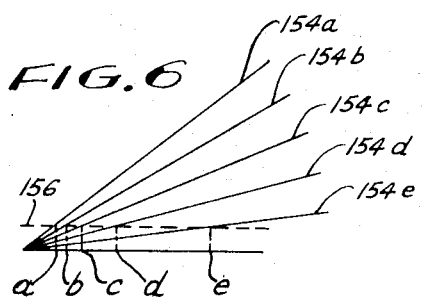

FIGS. 3 and 4 are graphical representations illustrating two different conditions of operation of the system, FIG. 3 illustrating operation under inrush current control conditions and FIG. 4 illustrating operation under normal current conditions; and FIGS. 5 and 6 are graphical representations illustrating one specific attribute of the circuit here disclosed by means of which an essentially linear relationship is produced between capacitor charging rate and charging time.

Figure 1:
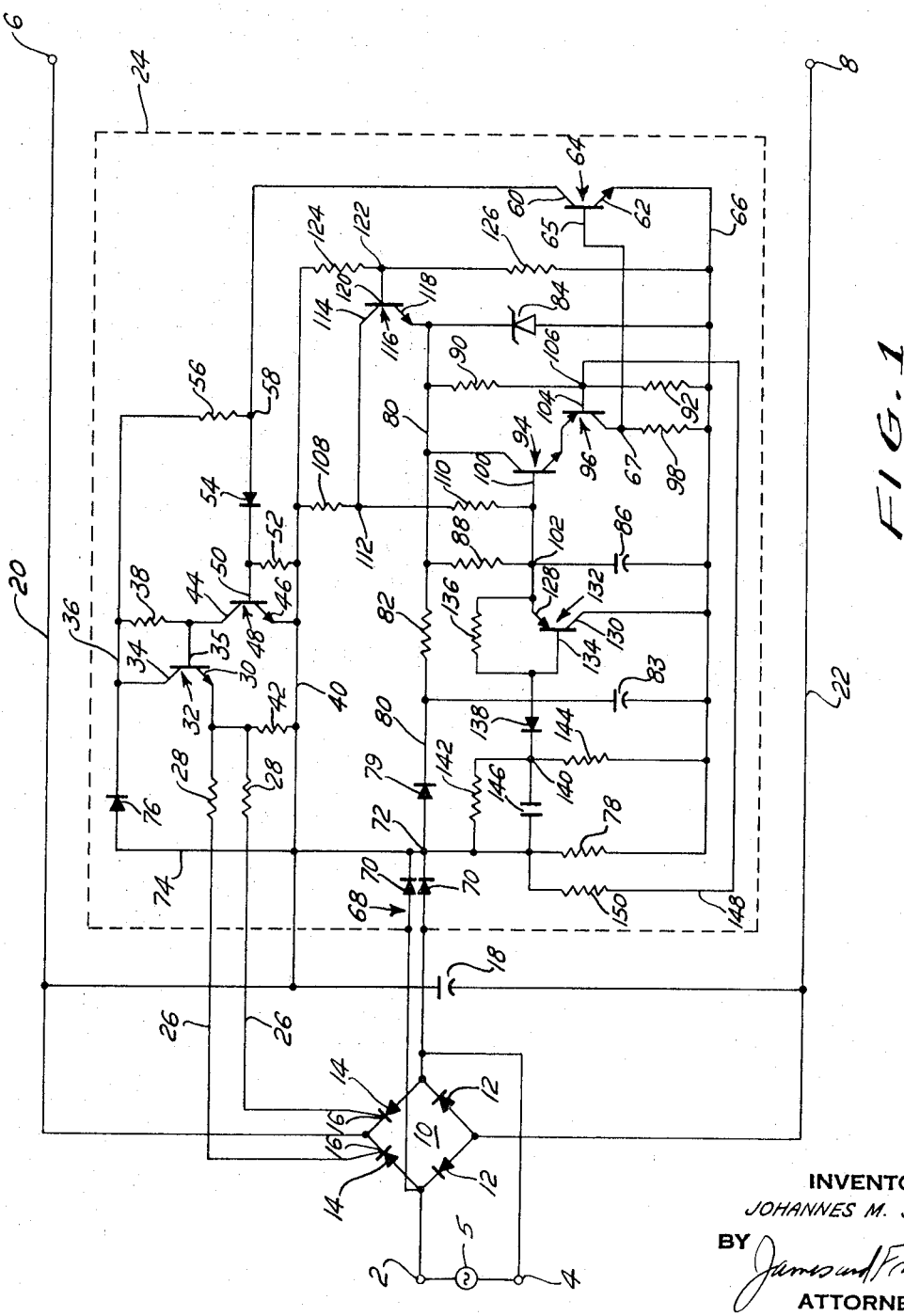
FIG. 1 is a circuit diagram of a preferred embodiment of the present invention.

Turning first to the embodiment of FIG. 1, the circuitry of the present invention is there disclosed in the form of a power supply comprising a pair of a pair of input terminals 2 and 4 to which an AC source of power 5 is adapted to be connected, and a pair of output terminals 6 and 8, a full wave rectifier bridge generally designated 10 being connected between input and output and comprising a pair of conventional rectifiers 12 and a pair of controlled rectifiers 14, the latter having control electrodes 16. A capacitor 18 is connected between the lines 20 and 22 which connect the output electrodes 6 and 8 and the rectifier 10, said capacitor 18 defining a capacitive load. In this general type of system, which is well known, each of the controlled rectifiers 14 will be potentially conductive during each alternate half-cycle of the AC input to the input electrodes 2 and 4, but they will actually be conductive during their periods of potential conductivity only after an appropriate energizing signal has been applied to their control electrodes 16. Hence the amount of current passing through the bridge 10, and consequently the output of the system, can be controlled by controlling the particular points of time, during each period of potential conductivity of the controlled rectifiers 14, when their control electrodes 16 are energized. The earlier during each period of potential conductivity that the control electrodes 16 are energized, the greater will be the current flow and the system output.

As has been indicated, it is desired to limit the rate of inrush current flow during the starting up of the system. This is accomplished by the control circuitry for the system, shown enclosed within the broken line 24 of FIG. 1. The control electrodes 16 of the controlled rectifiers 14 are connected by leads 26 and resistors 28 to the emitter 30 of a signal transistor 32 the collector 34 of which is connected to a biasing voltage line 36 and the base 35 of which is connected by resistor 38 to that line 36. Line 40 is connected to the positive output line 20. The emitter 30 of transistor 32 is connected to line 40 via resistor 42. The base 35 of transistor 32 is connected to the line 40 via collector 44 and emitter 46 of disabling transistor 48, the base 50 of the transistor 48 being connected to line 40 by resistor 52 and being connected to line 36 by rectifier 54 and resistor 56. The point 58 between the resistor 56 and the rectifier 54 is connected by the collector 60 and emitter 62 of bypass transistor 64 to reference potential line 66.

A second full-wave rectifier bridge, generally designated 68 and comprising the conventional rectifiers 12 and a pair of additional conventional rectifiers 70, produces at point 72 a full-wave rectified voltage. Lead 74 and rectifier 76 connect point 72 to line 36. Resistor 78 is connected between point 72 and the reference potential line 66. Line 80 is connected to point 72, via rectifier 79, and resistor 82 is located in line 80. Zener diode 84 is connected between lines 80 and 66. As a result, the voltage on line 80 to the left of resistor 82 is unstabilized and varies in full-wave rectified form, being the output of rectifier bridge 68, while the voltage on line 80 to the right of resistor 82 is stabilized by Zener diode 84 to the characteristic breakdown voltage of said diode, usually a few volts. Filter capacitor 83 is connected between the lines 80 and 66 to the left of resistor 82.

Connected between the lines 80 and 66 is a regulating or timing capacitor 86 and a resistor 88 connected in series. Also connected between lines 80 and 66 is a voltage divider defined by resistors 90 and 92. Also connected between lines 80 and 66 is a NPN transistor 94 and a PNP resistor 96 the output electrodes of which are connected in series with one another and with resistor 98. The base 100 of transistor 94 is connected to point 102 at the upper end of capacitor 86 and the base 104 of transistor 96 is connected to point 106 between resistors 90 and 92. The base 65 of bypass transistor 64 is connected to point 67 at the upper end of resistor 98.

The line 40 is also connected to the point 102 at the upper end of capacitor 86 via resistors 108 and 110. Point 112 between the resistors 108 and 110 is connected to the collector 114 of a regulating transistor 116 the emitter 118 of which is connected to line 80 and the base 120 of which is connected to point 122 between resistors 124 and 126 which define a voltage divider between the lines 40 and 66.

The point 102 at the upper end of capacitor 86 is connected to reference voltage line 66 via the emitter 128 and collector 130 of discharging transistor 132. The base 134 of that transistor is connected to the emitter 128 by resistor 136. It is also connected via rectifier 138 to point 140 on a voltage divider defined by resistors 142 and 144 and connected across the output of rectifier bridge 68. A capacitor 146 is connected in shunt with resistor 142. Point 72 is connected by line 148 which contains resistor 150 to point 106.

The control electrodes 16 of the controlled rectifier 14 will be energized when the signal transistor 32 is conductive. The transistor 32 will be conductive when its collector 34 and emitter 30 are properly biased and when its base electrode 35 is properly energized. The proper bias for the output electrodes 34, 30 of the transistor 32 will occur only when line 36 is at a higher potential than line 40, and that will be the case when the normal full-wave rectifier output produced by the rectifier bridge 68 exceeds the system output applied across the load capacitor 18. Under these circumstances base current will be supplied both to transistors 32 and 48. This will render disabling transistor 48 conductive, thus bypassing base current to transistor 32 and maintaining the transistor 32 in nonconductive condition. Transistor 32 will become conductive only if disabling transistor 48 becomes nonconductive, and that will occur only if the base current thereto is bypassed. The bypass transistor 64 controls the bypassing of the base current to transistor 48. When transistor 64 is conductive the base current for transistor 48 will be bypassed, transistor 32 will become conductive the control electrodes 16 for the controlled rectifier 14 will be energized, and the appropriate one of the controlled rectifiers 14, depending upon the polarity of the AC input, will become conductive.

The conductivity status of bypass transistor 64 is controlled by the current applied to its base 65. Base current is supplied thereto, rendering the bypass transistor 64 conductive, when the two transistors 94 and 96 become conductive. This will occur when the voltage at point 102, connected to the base 100 of transistor 94, becomes higher than that at point 106, connected to the base 104 of transistor 96, and that will occur when the capacitor 86 has charged sufficiently to bring the point 102 to such a value of potential. There are two charging sources for the capacitor 86. One is from line 40 via resistors 108 and 110, and the other is from the Zener-diode-stabilized portion of line 80 via resistor 88. The latter charging source is relatively constant, maintained so by Zener diode 84. The former, however, depends upon the voltage across load capacitor 18, which in turn will reflect the system output voltage. The lower that voltage the lesser will be the charging rate of the capacitor 86, and the higher that voltage the greater will be the charging rate of that capacitor.

The capacitor 86 is periodically discharged through the output electrodes of discharging transistor 132. The base 134 of that transistor is periodically energized to render the transistor conductive, thereby to discharge the capacitor 86, by sensing the fluctuating rectified voltage at point 72, which voltage will fluctuate in timed relation with the AC input to terminals 2 and 4. When the voltage at point 72 reaches a zero value, that voltage will be transferred to the base 134 of transistor 132, rendering the latter conductive and discharging the capacitor 86. As the voltage at point 72 rises the transistor 132 will turn off, and the capacitor will then be permitted to recharge, at a rate determined, as we have seen, by the voltages on lines 80 and 40 and hence to an appreciable extent in accordance with the output voltage of the system. The function of the capacitor 146 is to ensure that the base 134 of the transistor 132 is reliably brought at least to a zero value; the capacitor 146 charges while point 72 is at a positive potential, its side connected to point 140 thus becomes negative, and this negative voltage persists long enough to make certain that the transistor 132 is rendered conductive even if the voltage at point 72 does not go all the way to zero.

When the system is first started up the output voltage is zero and hence the voltage at line 40 is zero. This means that the only charging source for the capacitor 86 is the voltage at the stabilized portion of line 80. The capacitor 86 will thus charge slowly, and the voltage at point 102 will reach that at point 106 only after a substantial portion of a half-cycle of the AC input has elapsed. This is schematically indicated in FIG. 3, where line 152 represents the rectified voltage at point 72, line 154 represents the voltage at point 102, broken line 156 represents the voltage at point 106, and hence the voltage to which point 102 must rise before the transistors 94 and 96 become conductive, and line 158 represents the voltage at line 80. The control electrode 16 of the appropriate controlled rectifier 14 is not energized until the point 102 reaches the potential of point 106, that is to say, until line 154 crosses line 156 in the graphical representation in FIG. 3. The vertical line 160 represents the point in time when the appropriate controlled rectifier 14 is thus energized, and the shaded area 162 represents the volt-seconds when current flows and hence is a measure of the amount of current which flows.

The appropriate controlled rectifier continues to be conductive until the voltage 152 at point 72 returns to zero, at which time the transistor 132 is rendered conductive and the capacitor 86 discharges therethrough, thus once again turning off the bypass transistor 64, rendering the disabling transistor 48 conductive, rendering the signal transistor 32 nonconductive, and deenergizing the control electrodes 16 for the controlled rectifiers 14.

As the voltage at point 72 starts to rise again the transistor 132 is turned off and the capacitor 86 begins to charge again. This time, because there is some output voltage across the capacitor 18 and hence at the line 40, a somewhat greater charging current is provided, the regulating capacitor 86 will charge up somewhat more rapidly, and hence the transistor 64 will be turned on, thereby energizing the control electrodes 16 of the controlled rectifiers 14, somewhat earlier in the cycle than was formerly the case. Hence current will flow through the appropriate controlled rectifier 14 for a longer period of time. Since there is already an appreciable voltage across load capacitor 18, the current will build up more slowly than before, so that the maximum value of current flow will not become excessive. The output voltage across capacitor 18 will build up further, and the progression will continue until the output voltage has built up substantially to normal conditions. In that normal condition, as schematically illustrated in FIG. 4, the line 154', representing the charging rate of regulating or timing capacitor 86, is considerably steeper than the line 154 of FIG. 3, so that it crosses the reference line 156 much earlier in the cycle, thereby causing the current through the rectifier bridge 10 to flow much sooner, as schematically indicated by line 160' and shaded area 162' in FIG. 4.

When normal operating conditions have been reached, the regulating transistor 116 will take over control. Base current to the transistor 116 is provided from line 40 which is connected to the positive end of output capacitor 18. As the voltage across capacitor 18 increases above a predetermined value, the transistor 116 will become conductive in response to the base current provided thereto, and this will have the effect of bypassing some of the charging current normally provided to capacitor 86 from the line 40. As a result the capacitor 86 will be charged more slowly than would otherwise be the case, thus causing less current to flow and decreasing the output. Conversely, if the voltage should fall below a nominal value the transistor 116 will become less conductive, more current will be available to charge the capacitor 86, the controlled rectifiers 14 will conduct sooner, more current will flow, and the output will increase. It will be appreciated that the effect which regulating transistor 116 produces in response to changes in the output voltage is just the opposite from the effect which those voltage changes have while the current is building up. That portion of the system which controls inrush current causes the current flow to start earlier as the voltage increases, whereas that portion of the system which provides for normal regulation delays the start of the current as the voltage output increases. The point at which regulation or inrush current control respectively become predominant is determined by the initial biasing of regulating transistor 116, and this may be made adjustable so as to vary the nominal value of output voltage to which the system is regulated.

It is desirable that the relation between the charging rate of the capacitor 86 and the time involved to charge it to its predetermined operative value be as closely linear as possible. As may be seen from FIG. 67 such a generally linear relationship will not normally obtain. Lines 154a—e represent capacitor charging rates (shown straightline for purposes of illustration) which differ from one another by equal increments. It will be seen that they intersect voltage line 156 at the time points marked a —e respectively, and that the time differences between each adjacent pair of points are markedly unequal. If the reference voltage 156 were, however, to vary with time as indicated by the line 156' in FIG. 5 then the time intervals between adjacent pairs of the points 2'—e' would be much more uniform. The electrical connection defined by line 148 and resistor 150 causes the voltage at point 106 to vary in the fashion of line 156' of FIG. 5 by superimposing on the normally constant voltage derived from the voltage divider 90, 92 an additional voltage which fluctuates up and down along with the rectified voltage 152 at point 72.

Figure 2:
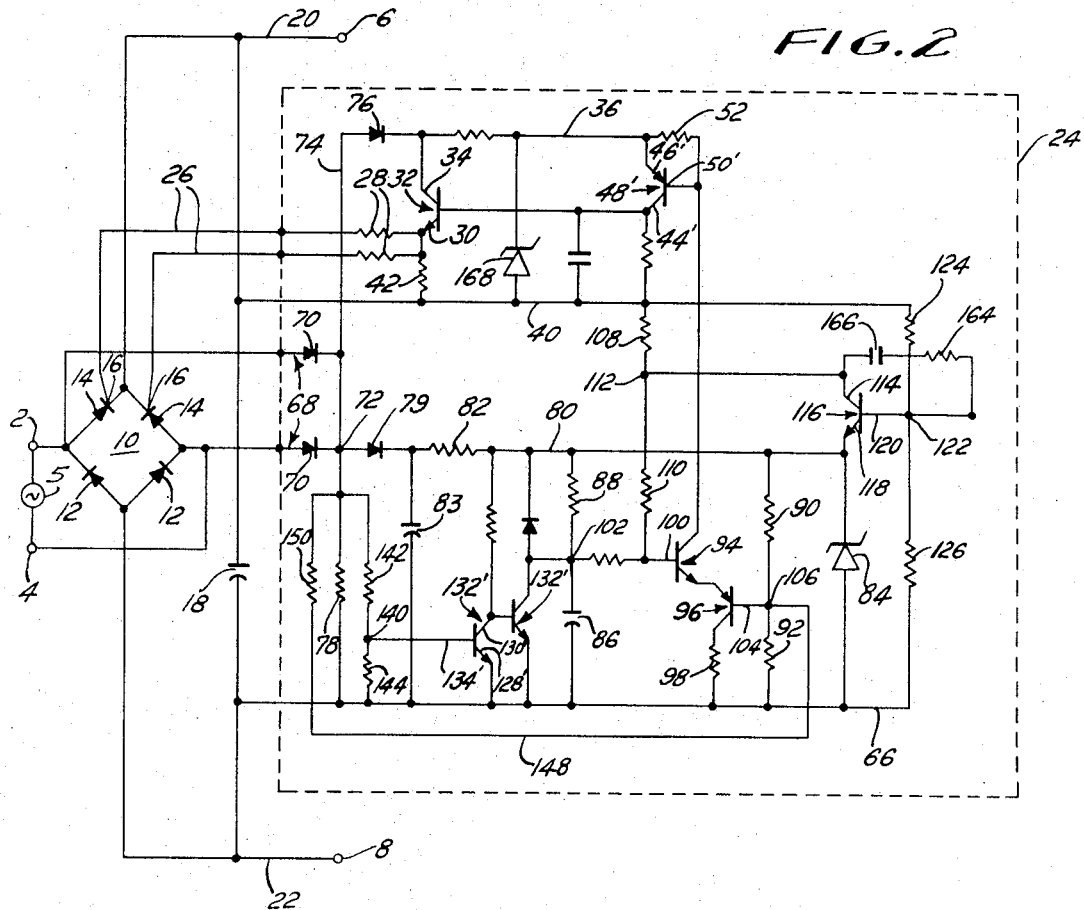
FIG. 2 is a circuit diagram of a modified preferred embodiment.

The embodiment of FIG. 2 operates in essentially the same fashion as the embodiment of FIG. 1, and utilizes many of the same or similar circuit components. Where appropriate the reference numerals of the circuit of FIG. 1 have been applied to the corresponding parts in the circuit of FIG. 2. In the circuit of FIG. 2 the transistor 48' is of the PNP type rather than the NPN type shown in FIG. 1. The transistors 94 and 96 in this embodiment are effective when conductive to turn transistor 48' on which then turns transistor 32 on the energized the control electrodes 16 of the controlled rectifiers 14. The PNP transistor 132 of FIG. 1 is replaced in FIG. 2 by a pair of NPN transistors 132', and the capacitor 146 of FIG. 1 is eliminated because with NPN transistors there is no longer any need to ensure that the bases 134' thereof be brought all the way to zero. A network comprising series-connected resistor 164 and capacitor 166 is connected between the base 120 and collector 114 of regulating transistor 116 for stability purposes. The Zener diode 168 connected between lines 36 and 40 limits the voltage applied to transistor 48', thus enabling the use with safety of a low voltage unit in that location. Such other differences as exist between FIGS. 2 and 1, represent conventional circuit modifications deriving from the changes described above.

From the above it will be seen that a system has been devised which provides for a regulated output from a rectifier circuit having a capacitive load and which also, using substantially the same circuitry employed for regulation, provides for inrush current limiting under conditions where the overall system would tend to produce very high current flows. The inrush current control is particularly effective when the system is first energized, but it will also be effective after the system has been operating, as when a short circuit might exist in the load, since such a situation will cause a marked drop in the voltage across load capacitor 18. The circuitry involved is simple, dependable and inexpensive, and the safety features are provided at extremely minimal cost and without adding appreciably to the complexity of the unit.

While but a limited number of embodiments have been here specifically disclosed, it will be apparent that many variations may be made therein, all within the scope of the instant invention as defined in the following claims.

I claim:

1. In a circuit comprising an input, an output, a capacitive load across said output, and controllable means for selectively connecting and disconnecting said input relative to said output; the improvement which comprises actuating means operatively connected to said controllable means and operatively effective to cause the latter to connect said input and said output, variable cyclical timing means operatively connected to said actuating means for rendering the latter inoperative and then operative in times sequence, means operatively connected to said output for detecting a situation where a high input current would be called for in normal operation of said power supply, and means operatively connected between said detecting means and said cyclical timing means and effective to decrease the time that said actuating means is rendered operative when said situation is detected, thereby to limit the input current, said detecting means being operatively connected to said capacitive load and sensitive to the voltage thereacross, said input is AC said controllable means comprises a controlled rectifier having a control electrode, said actuating means comprising a transistor operatively connected to said rectifier control electrode and itself having a control electrode, means for controllably supplying a signal to said transistor control electrode so as to cause the latter to energize said rectifier control electrode, and disabling means comprising a transistor operatively connected to said signal means and effective when operative to operatively remove said signal from said transistor control electrode, said timing means being operatively connected to said disabling means.

2. In a power supply of claim 1 regulating means operatively connected between said output and said actuating means and effective to cause the time when said actuating means becomes operative to occur sooner as a given parameter of said output decreases when said parameter is in a predetermined normal range, thereby to produce output regulation.

3. The circuit of claim 1, in which said timing means comprises a capacitor, charging means for said capacitor having a nominal time constant, discharging means for said capacitor, and cyclically operating control means effective to render said charging and discharging means alternately operative, said capacitor being effective to render said disabling means inoperative when said capacitor is charged to a predetermined degree, and said detecting means is operatively connected to said charging means and is effective to vary the charging rate of said capacitor in a sense to reduce that rate in response to the detection of said situation.

4. The circuit of claim 3, in which said discharging means is operatively connected to and controlled by the frequency of said input.

5. In a circuit comprising an input, an output, a capacitive load across said output, and controllable means for selectively connecting and disconnecting said input relative to said output; the improvement which comprises actuating means operatively connected to said controllable means and operatively effective to cause the latter to connect said input and said output, variable cyclical timing means operatively connected to said actuating means for rendering the latter inoperative and then operative in timed sequence, means operatively connected to said output for detecting a situation where a high input current would be called for in normal operation of said power supply, and means operatively connected between said detecting means and said cyclical timing means and effective to decrease the time that said actuating means is rendered operative when said situation is detected, thereby to limit the input current, and in which said timing means comprises a capacitor, charging means for said capacitor having a nominal time constant, discharging means for said capacitor, and cyclically operating control means effective to render said charging and discharging means alternately operative, said capacitor being operatively connected to said actuating means and effective to render the latter operative when said capacitor charged to a predetermined degree, and said detecting means is operatively connected to said charging means and is effective to vary the charging rate of said capacitor in a sense to reduce that rate in response to the detection of said situation, said means for discharging said capacitor comprises a transistor having output electrodes connected between said capacitor and a reference source and having a control electrode, and rectifying means connected between said input and said control electrode.

6. In the circuit of claim 5, a capacitor connected between said rectifying means and said control electrode.

7. In a circuit comprising an input, an output, a capacitive load across said output, and controllable means for selectively connecting and disconnecting said input relative to said output; the improvement which comprises actuating means operatively connected to said controllable means and operatively effective to cause the latter to connect said input and said output, variable cyclical timing means operatively connected to said actuating means for rendering the latter inoperative and then operative in timed sequence, means operatively connected to said output for detecting a situation where a high input current would be called for in normal operation of said power supply, and means operatively connected between said detecting means and said cyclical timing means and effective to decrease the time that said actuating means is rendered operative when said situation is detected, thereby to limit the input current, said controllable means comprising a controlled rectifier having a control electrode, said actuating means comprises a transistor operatively connected to said rectifier control electrode and itself having a control electrode, signal means for controllably supplying a signal to said transistor control electrode so as to cause the latter to energize said rectifier control electrode, and disabling means comprising a transistor operatively connected to said signal means and effective when operative to operatively remove said signal from said transistor control electrode, said timing means being operatively connected to said disabling means.

8. The circuit of claim 7, in which said timing means comprises a capacitor, charging means for said capacitor having a nominal time constant, discharging means for said capacitor, and cyclically operating control means effective to render said changing and discharging means alternately operative, said capacitor being effective to render said disabling means inoperative when said capacitor is charged to a predetermined degree, and said detecting means is operatively connected to said charging means and is effective to vary the charging rate of said capacitor in a sense to reduce that rate in response to the detection of said situation.

9. The circuit of claim 8, in which said input is AC, said discharging means being operatively connected to and controlled by the frequency of said input.

10. The circuit of claim 7, in which said timing means comprises a capacitor operatively connected to said disabling means, charging means for said capacitor having a nominal time constant, discharging means for said capacitor, and cyclically operating control means effective to e render said charging and discharging means alternately operative, said charging means comprising first and second elements, said first element providing to said capacitor a substantially constant charging means, said second element being operatively connected to said detecting means and providing to said capacitor a charging force controlled by said detecting means.